United States Patent
Shinde et al.

(10) Patent No.: US 11,035,251 B2
(45) Date of Patent: Jun. 15, 2021

(54) STATOR TEMPERATURE CONTROL SYSTEM FOR A GAS TURBINE ENGINE

(71) Applicant: General Electric Company, Schenectady, NY (US)

(72) Inventors: Kudum Shinde, Bangalore (IN); Tarun Sharma, Bangalore (IN); John David Bibler, Kings Mills, OH (US); Ajit Kumar Verma, Bangalore (IN); Ravinder Hamilpur, Bangalore (IN)

(73) Assignee: General Electric Company, Schenectady, NY (US)

( * ) Notice: Subject to any disclaimer, the term of this patent is extended or adjusted under 35 U.S.C. 154(b) by 43 days.

(21) Appl. No.: 16/583,781

(22) Filed: Sep. 26, 2019

(65) Prior Publication Data

US 2021/0095576 A1 Apr. 1, 2021

(51) Int. Cl.
*F01D 25/14* (2006.01)
*F01D 9/06* (2006.01)

(52) U.S. Cl.
CPC ............ *F01D 25/145* (2013.01); *F01D 9/06* (2013.01); *F05D 2240/14* (2013.01); *F05D 2240/15* (2013.01); *F05D 2260/202* (2013.01)

(58) Field of Classification Search
None
See application file for complete search history.

(56) References Cited

U.S. PATENT DOCUMENTS

| | | | | |
|---|---|---|---|---|
| 2,679,725 A | * | 6/1954 | Sharma | F02K 1/1207 60/263 |
| 2,919,548 A | * | 1/1960 | Herbstritt | F02C 3/305 60/39.26 |
| 2,925,712 A | * | 2/1960 | London | F02C 7/224 60/785 |
| 3,002,340 A | | 10/1961 | Landerman | |
| 4,458,481 A | * | 7/1984 | Ernst | F02C 3/14 60/39.511 |
| 4,645,415 A | * | 2/1987 | Hovan | F01D 25/125 415/115 |
| 5,136,837 A | | 8/1992 | Davison | |
| 6,190,127 B1 | | 2/2001 | Schmidt | |
| 6,939,392 B2 | * | 9/2005 | Huang | B01D 63/084 95/46 |
| 8,084,984 B2 | | 12/2011 | Lu et al. | |
| 8,186,933 B2 | | 5/2012 | Doss et al. | |
| 8,197,197 B2 | | 6/2012 | Flanagan | |
| 8,210,801 B2 | | 7/2012 | Ballard, Jr. et al. | |
| 8,523,512 B2 | | 9/2013 | Flanagan | |
| 9,151,176 B2 | | 10/2015 | Chillar et al. | |

(Continued)

FOREIGN PATENT DOCUMENTS

JP 2000314325 A 11/2000

*Primary Examiner* — Michael Lebentritt
(74) *Attorney, Agent, or Firm* — Dority & Manning, P.A.

(57) ABSTRACT

A stator temperature control system for a gas turbine engine is provided. The stator temperature control system includes a casing circumferentially surrounding a stator assembly, the casing having a top portion and a bottom portion; an air source having an inlet and an outlet; and a supply line in fluid communication with the outlet of the air source and the bottom portion of the casing, wherein the bottom portion of the casing receives a flow of air from the air source via the supply line to increase a temperature of the bottom portion of the casing.

20 Claims, 8 Drawing Sheets

(56) References Cited

U.S. PATENT DOCUMENTS

| | | | |
|---|---|---|---|
| 2008/0314060 A1* | 12/2008 | Parikh | B64D 13/00 |
| | | | 62/241 |
| 2011/0085894 A1* | 4/2011 | Dueckershoff | F01D 25/246 |
| | | | 415/175 |
| 2011/0171013 A1* | 7/2011 | Arzel | F01D 11/24 |
| | | | 415/180 |
| 2014/0250898 A1* | 9/2014 | Mackin | F02C 3/13 |
| | | | 60/772 |
| 2015/0260403 A1* | 9/2015 | Clemen | F23R 3/06 |
| | | | 60/752 |
| 2017/0159563 A1 | 6/2017 | Sennoun | |
| 2018/0100409 A1* | 4/2018 | Cochet | F01D 25/14 |
| 2018/0273186 A1* | 9/2018 | Peacos, III | B64D 13/06 |
| 2019/0063753 A1* | 2/2019 | Stevens | F23R 3/346 |
| 2020/0300164 A1* | 9/2020 | Muldoon | F02K 3/115 |

* cited by examiner

STATOR TEMPERATURE CONTROL SYSTEM FOR A GAS TURBINE ENGINE

FIELD

The present subject matter relates generally to a gas turbine engine, or more particularly to a gas turbine engine having a stator temperature control system.

BACKGROUND

Typical aircraft propulsion systems include one or more gas turbine engines. A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Advances in turbine engine aero- and thermodynamic performance have led to increasingly larger thermal gradients across turbine engine rotating and stator components. Larger thermal gradients, as well as the turbine engine duty cycle, induce high cycle fatigue (HCF) and low cycle fatigue (LCF), ultimately reducing the structural life of rotating and stator components. Additionally, thermal gradients are at least partially responsible for thermal bowing, or bowed rotor or bowed stator, in rotating and stator components such as shafts and/or casing components, due to asymmetric cooling following turbine engine shutdown.

HCF, LCF, and bowed rotor or bowed stator may result in component failure during turbine engine operation or necessitate replacement of the components at smaller intervals, thereby increasing turbine engine operating costs. HCF, LCF, and bowed rotor or bowed stator may also induce damage to other turbine engine components, such as bearings and casings, due to deformation of adjacent components, which may result in decreased turbine engine efficiency, performance, and structural life.

Therefore, there is a need for structures for mitigating bowed stator while mitigating adverse effects to turbine engine performance, efficiency, and economics.

BRIEF DESCRIPTION

Aspects and advantages of the invention will be set forth in part in the following description, or may be obvious from the description, or may be learned through practice of the invention.

In one exemplary embodiment of the present disclosure, a stator temperature control system for a gas turbine engine is provided. The stator temperature control system includes a casing circumferentially surrounding a stator assembly, the casing having a top portion and a bottom portion; an air source having an inlet and an outlet; and a supply line in fluid communication with the outlet of the air source and the bottom portion of the casing, wherein the bottom portion of the casing receives a flow of air from the air source via the supply line to increase a temperature of the bottom portion of the casing.

In certain exemplary embodiments the stator temperature control system includes a heat shield at least partially surrounding a part of the bottom portion of the casing, wherein the supply line is in fluid communication with the outlet of the air source and the heat shield, wherein the heat shield receives the flow of air from the air source via the supply line, and wherein the heat shield directs the flow of air to the bottom portion of the casing.

In certain exemplary embodiments the heat shield includes a heat shield inlet portion in fluid communication with the supply line; a plurality of flow channels in fluid communication with the heat shield inlet portion; and a plurality of flow apertures spaced around the heat shield and in communication with the plurality of flow channels, respectively, wherein the plurality of flow channels of the heat shield receive the flow of air from the air source via the supply line and the heat shield inlet portion, and wherein the plurality of flow apertures of the heat shield direct the flow of air to the bottom portion of the casing.

In certain exemplary embodiments the stator temperature control system includes a control valve between the outlet of the air source and the supply line, the control valve transitionable between an open position in which the supply line is in fluid communication with the outlet of the air source and the heat shield receives the flow of air from the outlet of the air source via the supply line, and a closed position in which the supply line is not in fluid communication with the outlet of the air source.

In certain exemplary embodiments the stator temperature control system includes a controller operable to transition the control valve between the open position and the closed position.

In certain exemplary embodiments the control valve is in the open position with the gas turbine engine in a ground idle pre-shutdown condition.

In certain exemplary embodiments the control valve is in the closed position with the gas turbine engine in a shutdown condition.

In certain exemplary embodiments the stator temperature control system includes a temperature control flange disposed in the bottom portion of the casing.

In certain exemplary embodiments the inlet of the air source receives bleed air from a portion of the gas turbine engine.

In certain exemplary embodiments the air source comprises an air supply precooler and the supply line comprises a bypass supply line.

In another exemplary embodiment of the present disclosure, a stator temperature control system for a gas turbine engine is provided. The stator temperature control system includes a casing circumferentially surrounding a stator assembly, the casing having a top portion and a bottom portion; a heat shield at least partially surrounding a part of the bottom portion of the casing; an air source having an inlet and an outlet; and a supply line in fluid communication with the outlet of the air source and the heat shield, wherein the heat shield receives a flow of air from the air source via the supply line, and wherein the heat shield directs the flow of air to the bottom portion of the casing to increase a temperature of the bottom portion of the casing.

In certain exemplary embodiments the heat shield includes a heat shield inlet portion in fluid communication with the supply line; a plurality of flow channels in fluid communication with the heat shield inlet portion; and a plurality of flow apertures spaced around the heat shield and in communication with the plurality of flow channels, respectively, wherein the plurality of flow channels of the heat shield receive the flow of air from the air source via the supply line and the heat shield inlet portion, and wherein the plurality of flow apertures of the heat shield direct the flow of air to the bottom portion of the casing.

In certain exemplary embodiments the stator temperature control system includes a control valve between the outlet of the air source and the supply line, the control valve transitionable between an open position in which the supply line is in fluid communication with the outlet of the air source and the heat shield receives the flow of air from the outlet of the air source via the supply line, and a closed position in which the supply line is not in fluid communication with the outlet of the air source.

In an exemplary aspect of the present disclosure, a method is provided for controlling a temperature of a stator assembly for a gas turbine engine. The method includes providing a casing circumferentially surrounding the stator assembly, the casing having a top portion and a bottom portion; providing an air source having an inlet and an outlet within the gas turbine engine; and directing a flow of air from the outlet of the air source to the bottom portion of the casing to increase a temperature of the bottom portion of the casing.

In certain exemplary aspects directing the flow of air from the outlet of the air source to the bottom portion of the casing comprises providing a supply line in fluid communication with the outlet of the air source and the bottom portion of the casing, wherein the bottom portion of the casing receives the flow of air from the outlet of the air source via the supply line.

In certain exemplary aspects the method includes providing a heat shield at least partially surrounding a part of the bottom portion of the casing, wherein the supply line is in fluid communication with the outlet of the air source and the heat shield.

In certain exemplary aspects directing the flow of air from the outlet of the air source to the bottom portion of the casing comprises moving the flow of air through the supply line to the heat shield, and wherein the heat shield directs the flow of air to the bottom portion of the casing.

In certain exemplary aspects directing the flow of air from the outlet of the air source to the bottom portion of the casing occurs with the gas turbine engine in a ground idle pre-shutdown condition and before shutdown of the gas turbine engine.

In certain exemplary aspects the method includes after the gas turbine engine is shutdown, directing a second flow of air from a second air source to the bottom portion of the casing via the supply line to increase the temperature of the bottom portion of the casing.

In certain exemplary aspects the inlet of the air source receives bleed air from a portion of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
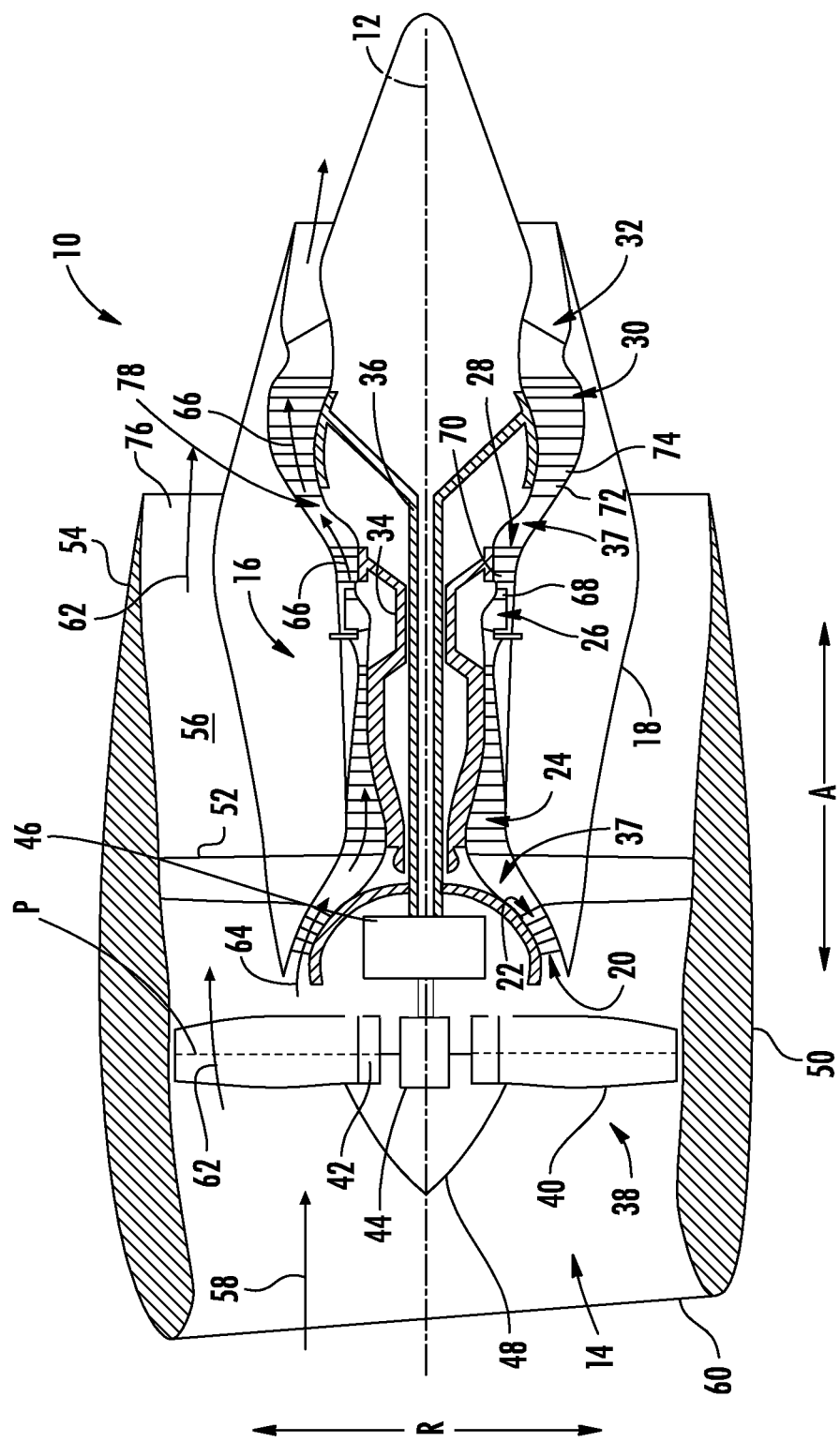
FIG. 1 is a schematic, cross-sectional view of an exemplary gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A stator temperature control system of the present disclosure includes a supply line that is in fluid communication with an outlet of an air source and a bottom portion of a casing surrounding a stator assembly. The supply line is configured to direct a flow of air from the air source to the bottom portion of the casing. In this manner, a stator temperature control system of the present disclosure advantageously is able to utilize a flow of air from the air source to increase a temperature of the bottom portion of the casing to reduce bowed stator.

During an engine shutdown period, the bottom portion of a casing surrounding a stator assembly has a tendency to cool down faster, or more so, than a top portion of a casing surrounding a stator assembly. By heating the bottom portion of the casing surrounding the stator assembly, a stator temperature control system of the present disclosure minimizes bowed rotor start due to stator thermal bowing. In an exemplary embodiment, a stator temperature control system of the present disclosure preheats the bottom portion of the casing surrounding the stator assembly before engine shutdown, e.g., with a gas turbine engine in a ground idle pre-shutdown condition. In this manner, a stator temperature control system of the present disclosure reduces stator thermal bowing during engine shutdown. A stator temperature control system of the present disclosure mitigates the risk of compressor rubs and/or blade tip rubs during bowed rotor start due to stator thermal bowing.

A stator temperature control system of the present disclosure reverses the thermal dynamics of the bottom portion of the casing to keep the bottom portion of the casing more in temperature alignment or uniformity with the top portion of the casing, i.e., the bottom portion and the top portion have a more uniform temperature alignment thereby reducing bowed stator. Another advantage of the present disclosure is that a stator temperature control system does not add any additional heat to the system, and utilizes a flow of air from an air source which is merely dumped in conventional systems.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or axis 12 provided for reference) and a radial direction R. In general, the turbofan 10 includes a fan section 14 and a turbomachine or core turbine engine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Additionally, the compressor section, combustion section 26, and turbine section together define at least in part a core air flowpath 37 extending therethrough. In various embodiments, HP compressor 24 is a source of bleed air.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It will be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be a direct drive turbofan engine (i.e., not including the power gearbox 46), may include a fixed pitch fan 38, etc. Additionally, or alternatively, aspects of the present disclosure may be incorporated into any other suitable gas turbine engine, such as a turboshaft engine, turboprop engine, turbojet engine, a land-based gas turbine engine for power generation, an aeroderivative gas turbine engine, etc. In such a manner, it will further be appreciated that in other embodiments the gas turbine engine may have any other suitable configuration, such as any other suitable number or arrangement of shafts, compressors, turbines, fans, etc.

Figures 2, 3:
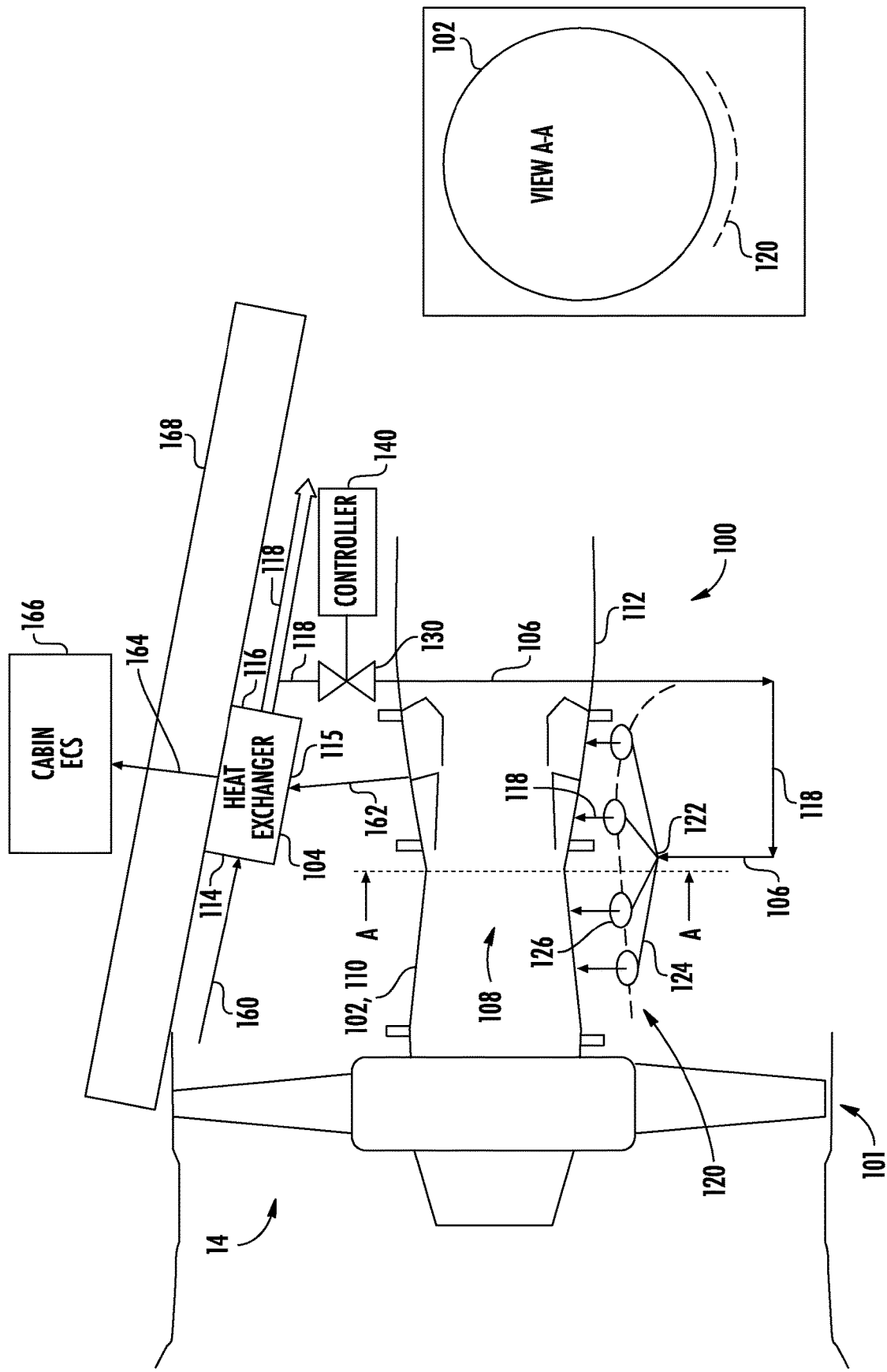
FIG. 2 is a schematic view of a stator temperature control system in accordance with an exemplary embodiment of the present disclosure.
FIG. 3 is a cross-sectional view taken alone line A-A of FIG. 2 with a heat shield surrounding a bottom portion of a casing in accordance with an exemplary embodiment of the present disclosure.
Figure 4:
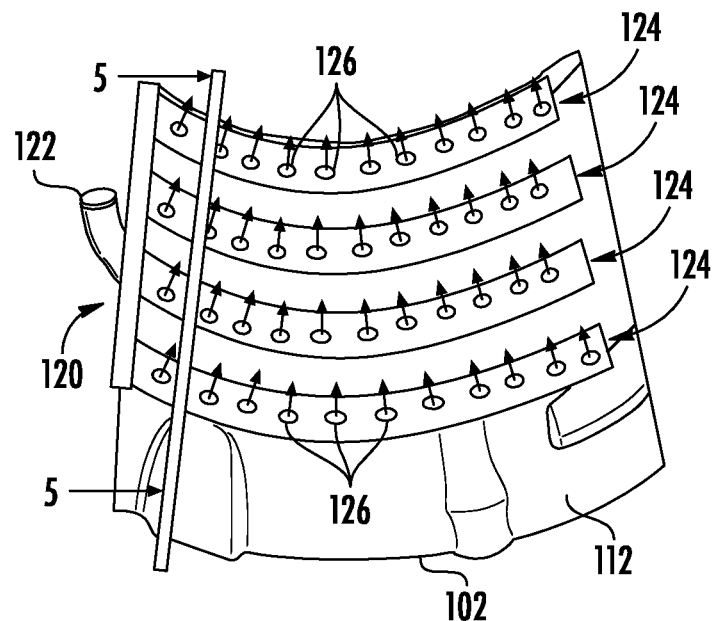
FIG. 4 is a perspective view of a heat shield surrounding a bottom portion of a casing in accordance with an exemplary embodiment of the present disclosure.
Figure 5:
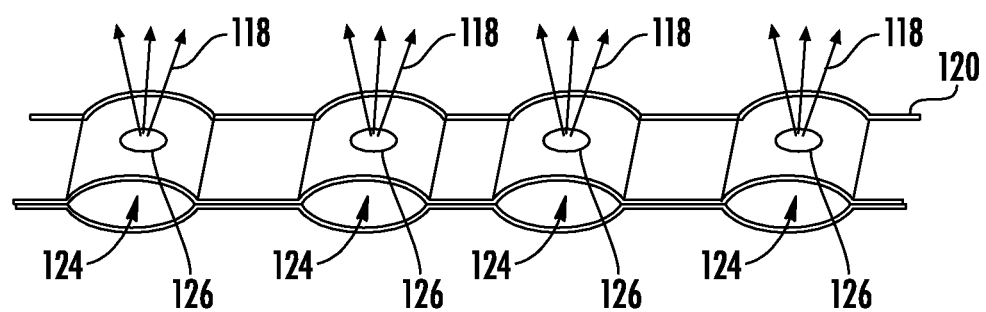
FIG. 5 is a cross-sectional view taken alone line 5-5 of FIG. 4 of a heat shield in accordance with an exemplary embodiment of the present disclosure.
Figure 9:
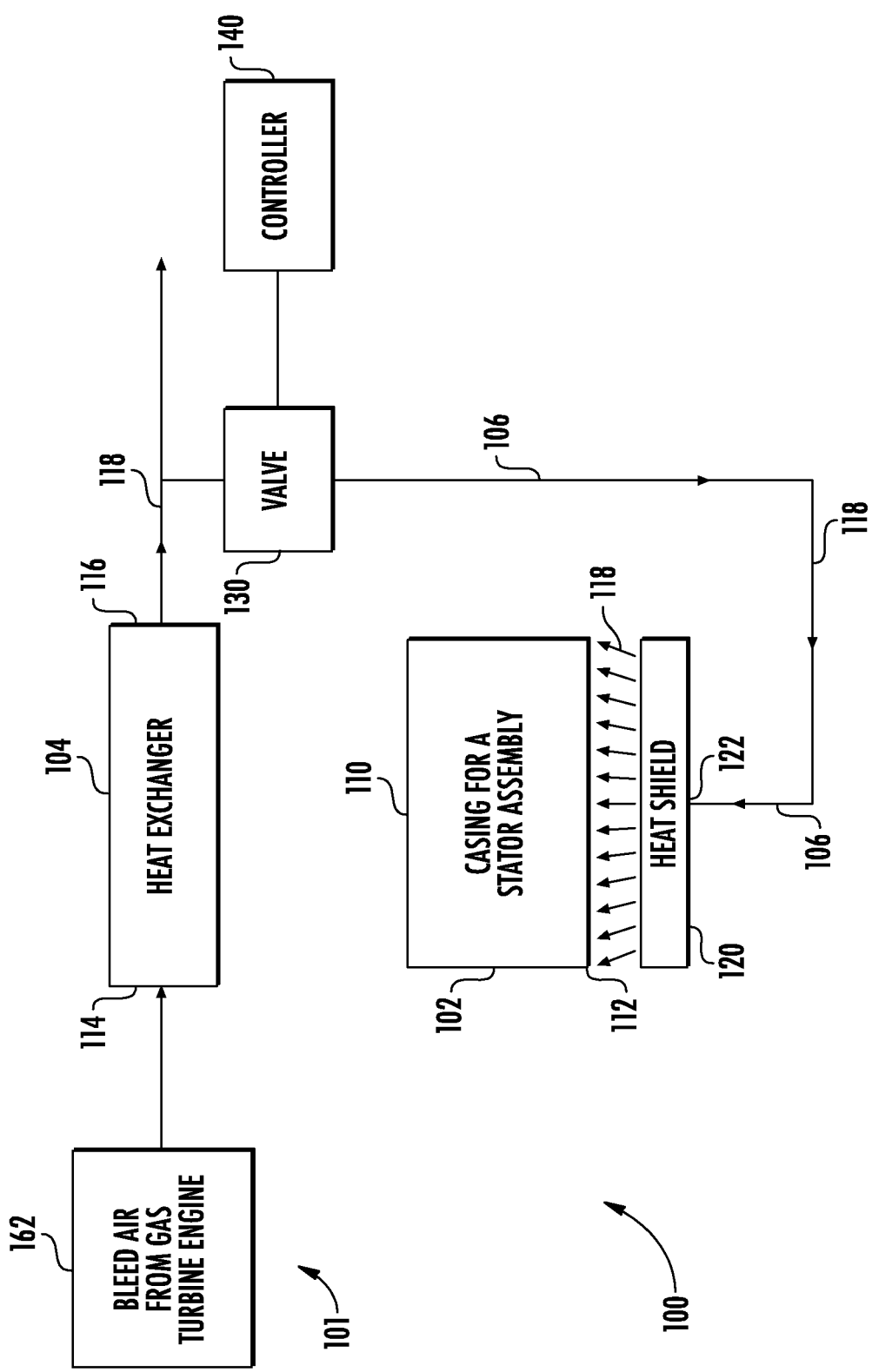
FIG. 9 is a schematic view of a stator temperature control system in accordance with another exemplary embodiment of the present disclosure.

Referring now to FIGS. 2 and 9, a schematic drawing of a stator temperature control system 100 for a gas turbine engine 101 in accordance with an exemplary aspect of the present disclosure is provided. In at least certain exemplary embodiments, the exemplary stator temperature control system 100 depicted in FIGS. 2 and 9 may be incorporated into, e.g., the exemplary engine 10 described above with reference to FIG. 1.

FIGS. 2 and 9 illustrate exemplary embodiments of the present disclosure. Referring to FIGS. 2 and 9, a stator temperature control system 100 for a gas turbine engine 101 includes a casing 102, an air source 104, and a supply line 106.

In an exemplary embodiment, the casing 102 circumferentially surrounds a stator assembly 108 of the gas turbine engine 101. The casing 102 includes a top portion 110 and a bottom portion 112. In one embodiment, the air source 104 includes an inlet 114, an outlet 116, and provides a flow of air 118 from the outlet 116. In an exemplary embodiment, the air source 104 is a heat exchanger 104. In other exemplary embodiments, the air source 104 may be any source of air that provides a flow of air from the outlet 116 of the air source 104 to the bottom portion 112 of the casing 102 to increase a temperature of the bottom portion 112 of the casing 102. In one exemplary embodiment, the supply line 106 may be a bypass supply line such that a portion of air is diverted from the air source 104 via the supply line 106 to the bottom portion 112 of the casing 102 to increase a temperature of the bottom portion 112 of the casing 102. In other exemplary embodiments, the supply line 106 may be a direct supply line. In other embodiments, the supply line 106 may have other alternative configurations.

Referring to FIGS. 2 and 9, in an exemplary embodiment, the air source 104, e.g., heat exchanger 104, includes an inlet 114, an outlet 116, and provides a flow of exhaust air 118 from the outlet 116. Referring to FIG. 2, in one exemplary embodiment, a first inlet 114 of the heat exchanger 104 may receive fan air 160 from a portion of the gas turbine engine 101, e.g., from fan section 14, and a second inlet 115 of the heat exchanger 104 may receive bleed air 162 from a portion of the gas turbine engine 101. In one exemplary embodiment, the heat exchanger 104 is an air supply precooler. For example, the heat exchanger 104 may be an air supply precooler that receives compressor bleed air 162 and fan air 160 therein such that the bleed air 162 is cooled by the fan air 160 in the heat exchanger 104 and a portion of air 164 may then be delivered to an aircraft environmental control system 166 for controlling cabin air freshness, pressure, and temperature. The heat exchanger 104 also provides a flow of exhaust air 118 from the outlet 116. In one exemplary embodiment, the portion of air 164 that is delivered to an aircraft environmental control system 166 may pass through an airplane pylon 168 that is used to hold an aircraft engine, e.g., a gas turbine engine 101, in its place and position relative to a wing of the aircraft.

Referring to FIGS. 2 and 9, in an exemplary embodiment, the stator temperature control system 100 of the present disclosure includes a bypass supply line 106 that is in fluid communication with the outlet 116 of the heat exchanger 104 and the bottom portion 112 of the casing 102. The bypass supply line 106 of the present disclosure may include any ducts, channels, and/or fluid passageways to direct a fluid, e.g., a flow of exhaust air 118, therethrough. The bypass supply line 106 is configured to direct a flow of exhaust air 118 from the outlet 116 of the heat exchanger 104 to the bottom portion 112 of the casing 102. In this manner, the stator temperature control system 100 of the present disclosure advantageously is able to utilize a flow of exhaust air 118 from the heat exchanger 104 to increase a temperature of the bottom portion 112 of the casing 102 to reduce bowed stator.

Referring to FIGS. 2 and 9, in an exemplary embodiment of the present disclosure, the bottom portion 112 of the casing 102 receives a flow of exhaust air 118 from the outlet 116 of the heat exchanger 104 via the bypass supply line 106 to increase a temperature of the bottom portion 112 of the casing 102.

During an engine shutdown period, the bottom portion 112 of a casing 102 surrounding a stator assembly 108 has a tendency to cool down faster, or more so, than a top portion 110 of a casing 102 surrounding a stator assembly 108. By heating the bottom portion 112 of the casing 102 surrounding the stator assembly 108, the stator temperature control system 100 of the present disclosure minimizes bowed rotor start due to stator thermal bowing. In an exemplary embodiment, the stator temperature control system 100 of the present disclosure preheats the bottom portion 112 of the casing 102 surrounding the stator assembly 108 before engine shutdown, e.g., with the gas turbine engine 101 in a ground idle pre-shutdown condition. In this manner, a stator temperature control system 100 of the present disclosure reduces stator thermal bowing during engine shutdown. A stator temperature control system 100 of the present disclosure mitigates the risk of compressor rubs and/or blade tip rubs during bowed rotor start due to stator thermal bowing.

A stator temperature control system 100 of the present disclosure reverses the thermal dynamics of the bottom portion 112 of the casing 102 to keep the bottom portion 112 of the casing 102 more in temperature alignment or uniformity with the top portion 110 of the casing 102, i.e., the bottom portion 112 and the top portion 110 have a more uniform temperature alignment thereby reducing bowed stator. Another advantage of the present disclosure is that the stator temperature control system 100 does not add any additional heat to the system, and utilizes a flow of exhaust air 118 from heat exchanger 104 which is merely dumped in conventional systems.

In at least certain exemplary embodiments, a stator temperature control system 100 of the present disclosure is configured to increase a temperature of the bottom portion 112 of the casing 102, e.g., approximately a 6 o'clock position of the bottom portion 112 of the casing 102. In at least certain exemplary embodiments, a stator temperature control system 100 of the present disclosure is configured to increase a temperature of the bottom portion 112 of the casing 102, e.g., approximately a 5 o'clock position to approximately a 7 o'clock position of the bottom portion 112 of the casing 102. In at least certain exemplary embodiments, a stator temperature control system 100 of the present disclosure is configured to increase a temperature of the bottom portion 112 of the casing 102, e.g., approximately a 4 o'clock position to approximately an 8 o'clock position of the bottom portion 112 of the casing 102. In at least certain exemplary embodiments, a stator temperature control system 100 of the present disclosure is configured to increase a temperature of the bottom portion 112 of the casing 102, e.g., approximately a 3 o'clock position to approximately a 9 o'clock position of the bottom portion 112 of the casing 102.

In at least certain exemplary embodiments, during a ground idle pre-shutdown condition, a bottom portion 112 of the casing 102 may have a temperature of approximately 250 degrees Fahrenheit. In at least certain exemplary embodiments, during a ground idle pre-shutdown condition, a bottom portion 112 of the casing 102 may have a temperature of approximately 225 degrees Fahrenheit to approximately 275 degrees Fahrenheit. In at least certain exemplary embodiments, during a ground idle pre-shutdown condition, a bottom portion 112 of the casing 102 may have a temperature of approximately 200 degrees Fahrenheit to approximately 300 degrees Fahrenheit.

As described above, a stator temperature control system 100 of the present disclosure advantageously is able to utilize a flow of exhaust air 118 from the heat exchanger 104 to increase a temperature of the bottom portion 112 of the casing 102 to reduce bowed stator. In at least certain exemplary embodiments, the heat exchanger 104 may provide a flow of exhaust air 118 that has a temperature of approximately 450 degrees Fahrenheit. In at least certain exemplary embodiments, the heat exchanger 104 may provide a flow of exhaust air 118 that has a temperature of approximately 425 degrees Fahrenheit to approximately 475 degrees Fahrenheit. In at least certain exemplary embodiments, the heat exchanger 104 may provide a flow of exhaust air 118 that has a temperature of approximately 400 degrees Fahrenheit to approximately 500 degrees Fahrenheit. In at least certain exemplary embodiments, the heat exchanger 104 may provide a flow of exhaust air 118 that has a temperature of approximately 375 degrees Fahrenheit to approximately 525 degrees Fahrenheit. In at least certain exemplary embodiments, the heat exchanger 104 may provide a flow of exhaust air 118 that has a temperature of approximately 350 degrees Fahrenheit to approximately 550 degrees Fahrenheit.

In other words, the flow of exhaust air 118 from the heat exchanger 104 has a temperature that is significantly higher than the bottom portion 112 of the casing 102. A stator temperature control system 100 of the present disclosure advantageously utilizes this flow of exhaust air 118 to increase a temperature of the bottom portion 112 of the casing 102 to reduce bowed stator as described herein. A stator temperature control system 100 of the present disclosure reduces stator bow by preferential stator heating to counter any bow generated during engine shutdown.

In at least certain exemplary embodiments, a stator temperature control system 100 of the present disclosure reduces stator bowing by approximately 2 mils. In at least certain exemplary embodiments, a stator temperature control system 100 of the present disclosure reduces stator bowing by approximately 2-3 mils. In at least certain exemplary embodiments, a stator temperature control system 100 of the present disclosure reduces stator bowing by approximately 2-4 mils. In at least certain exemplary embodiments, a stator temperature control system 100 of the present disclosure reduces stator bowing by approximately 2-5 mils.

Referring to FIGS. 2 and 9, a stator temperature control system 100 for a gas turbine engine 101 also includes a heat shield 120 at least partially surrounding a part of the bottom portion 112 of the casing 102. In some exemplary embodiments, the heat shield 120 at least partially surrounds a part of the bottom portion 112 of the casing 102, as shown in FIGS. 2 and 3. In other exemplary embodiments, the heat shield 120 may circumferentially surround a part of the bottom portion 112 of the casing 102.

In at least certain exemplary embodiments, a heat shield 120 circumferentially surrounds the bottom portion 112 of the casing 102, e.g., approximately a 6 o'clock position of the bottom portion 112 of the casing 102. In at least certain exemplary embodiments, a heat shield 120 circumferentially surrounds the bottom portion 112 of the casing 102, e.g., approximately a 5 o'clock position to approximately a 7 o'clock position of the bottom portion 112 of the casing 102. In at least certain exemplary embodiments, a heat shield 120 circumferentially surrounds the bottom portion 112 of the casing 102, e.g., approximately a 4 o'clock position to approximately an 8 o'clock position of the bottom portion 112 of the casing 102. In at least certain exemplary embodiments, a heat shield 120 circumferentially surrounds the bottom portion 112 of the casing 102, e.g., approximately a 3 o'clock position to approximately a 9 o'clock position of the bottom portion 112 of the casing 102. In other exemplary embodiments, the heat shield 120 may circumferentially surround the entirety of the casing 102, e.g., the top portion 110 and the bottom portion 112 of the casing 102. In some exemplary embodiments, the heat shield 120 may circumferentially surround the entirety of the bottom portion 112 of the casing 102 and some of the top portion 110 of the casing 102.

Referring to FIGS. 2 and 9, the bypass supply line 106 is in fluid communication with the outlet 116 of the heat exchanger 104 and the heat shield 120. In such exemplary embodiments, the heat shield 120 receives a flow of exhaust air 118 from the outlet 116 of the heat exchanger 104 via the bypass supply line 106. A heat shield 120 of the present disclosure also is able to direct a flow of exhaust air 118 to the bottom portion 112 of the casing 102. For example, referring to FIGS. 2-5, a heat shield 120 of the present disclosure includes a heat shield inlet portion 122, a plurality of flow channels 124, and a plurality of flow apertures 126.

The heat shield inlet portion 122 of the heat shield 120 is in fluid communication with the bypass supply line 106 and the plurality of flow channels 124 of the heat shield 120 are in fluid communication with the heat shield inlet portion 122. Furthermore, the plurality of flow apertures 126 are spaced around the heat shield 120 and are in communication with the plurality of flow channels 124, respectively. For example, referring to FIG. 4, the plurality of flow apertures 126 are spaced around the heat shield 120 so that with the heat shield 120 circumferentially surrounding the bottom portion 112 of the casing 102, the flow apertures 126 are able to direct a flow of exhaust air 118 over the surface area of the bottom portion 112 of the casing 102 to uniformly heat the bottom portion 112 of the casing 102 with the exhaust air 118. In this manner, a heat shield 120 of the present disclosure allows hot exhaust air 118 to be directed over the entirety of the bottom portion 112 of the casing 102 in a uniform manner.

Referring to FIGS. 2-5, in an exemplary embodiment, the plurality of flow channels 124 of the heat shield 120 receive a flow of exhaust air 118 from the outlet 116 of the heat exchanger 104 via the bypass supply line 106 and the heat shield inlet portion 122, and the plurality of flow apertures 126 of the heat shield 120 direct the flow of exhaust air 118 to the bottom portion 112 of the casing 102 as described above.

In one exemplary embodiment, a heat shield 120 of the present disclosure is formed using precision casting, advanced machining, or other traditional manufacturing machines or methods. In other exemplary embodiments, a heat shield 120 of the present disclosure is formed using additive manufacturing machines or methods. As described in detail below, exemplary embodiments of the formation of a heat shield 120 involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Forming a heat shield 120 using additive manufacturing machines or methods enable a heat shield 120 of the present disclosure to include flow channels 124 and flow apertures 126 as described herein.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming a heat shield 120 of the present disclosure using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single heat shield 120 to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of a heat shield 120 of the present disclosure. Accordingly, a three-dimensional design model of the component may be defined prior to manufacturing. In this regard, a model or prototype of the component may be scanned to determine the three-dimensional information of the component. As another example, a model of a heat shield 120 of the present disclosure may be constructed using a suitable computer aided design (CAD) program to define the three-dimensional design model of the component.

The design model may include 3D numeric coordinates of the entire configuration of a heat shield 120 of the present disclosure including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, a heat shield 120 of the present disclosure described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

In addition, utilizing an additive process, the surface finish and features of a heat shield 120 of the present disclosure may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of a heat shield 120 of the present disclosure is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

While the present disclosure is not limited to the use of additive manufacturing to form a heat shield 120 of the present disclosure generally, additive manufacturing does provide a variety of manufacturing advantages, including ease of manufacturing, reduced cost, greater accuracy, etc.

Also, the additive manufacturing methods described above enable much more complex and intricate shapes and contours of a heat shield 120 described herein to be formed with a very high level of precision. For example, such components may include thin additively manufactured layers, cross sectional features, and component contours. In addition, the additive manufacturing process enables the manufacture of a single integral heat shield 120 having different materials such that different portions of the component may exhibit different performance characteristics. The successive, additive nature of the manufacturing process enables the construction of these novel features. As a result, a heat shield 120 of the present disclosure formed using the methods described herein may exhibit improved performance and reliability.

Referring to FIGS. 2 and 7-9, a stator temperature control system 100 of the present disclosure also includes a control valve 130 that is disposed between the outlet 116 of the heat exchanger 104 and the bypass supply line 106.

In an exemplary embodiment, the control valve 130 is transitionable between a first or open position in which the bypass supply line 106 is in fluid communication with the outlet 116 of the heat exchanger 104 and the heat shield 120 receives a flow of exhaust air 118 from the outlet 116 of the heat exchanger 104 via the bypass supply line 106, e.g., the bottom portion 112 of the casing 102 receives a flow of exhaust air 118 from the outlet 116 of the heat exchanger 104 via the bypass supply line 106 to increase a temperature of the bottom portion 112 of the casing 102, and a second or closed position in which the bypass supply line 106 is not in fluid communication with the outlet 116 of the heat exchanger 104. In one exemplary embodiment, with the control valve 130 in the second or closed position, a flow of exhaust air 118 from the outlet 116 of the heat exchanger 104 is able to exhaust to atmosphere.

In one embodiment, the control valve 130 is in the open position with a gas turbine engine 101 in a ground idle pre-shutdown condition. In an exemplary embodiment, the control valve 130 is in the closed position with a gas turbine engine 101 in a shutdown condition.

Referring to FIGS. 2 and 9, a stator temperature control system 100 of the present disclosure also includes a controller 140 that is operable to transition the control valve 130 between the open position and the closed position.

The controller 140 may monitor an operational cycle of a stator temperature control system 100 of the present disclosure. For example, the controller 140 may monitor a state or condition of a gas turbine engine 101 and control the stator temperature control system 100 accordingly.

In an exemplary embodiment, when the controller 140 determines that a gas turbine engine 101 is in a ground idle pre-shutdown condition, the controller 140 is operable to move the control valve 130 to the open position in which the bypass supply line 106 is in fluid communication with the outlet 116 of the heat exchanger 104 and the bottom portion 112 of the casing 102 receives a flow of exhaust air 118 from the outlet 116 of the heat exchanger 104 via the bypass supply line 106 to increase a temperature of the bottom portion 112 of the casing 102. Furthermore, in an exemplary embodiment, when the controller 140 determines that a gas turbine engine 101 is in a shutdown condition, the controller 140 is operable to move the control valve 130 to the closed position in which the bypass supply line 106 is not in fluid communication with the outlet 116 of the heat exchanger 104. In this manner, the controller 140 closes the control valve 130 when the gas turbine engine 101 shutdowns so that no more flow of exhaust air 118 is directed to the bottom portion 112 of the casing 102.

Figure 8:
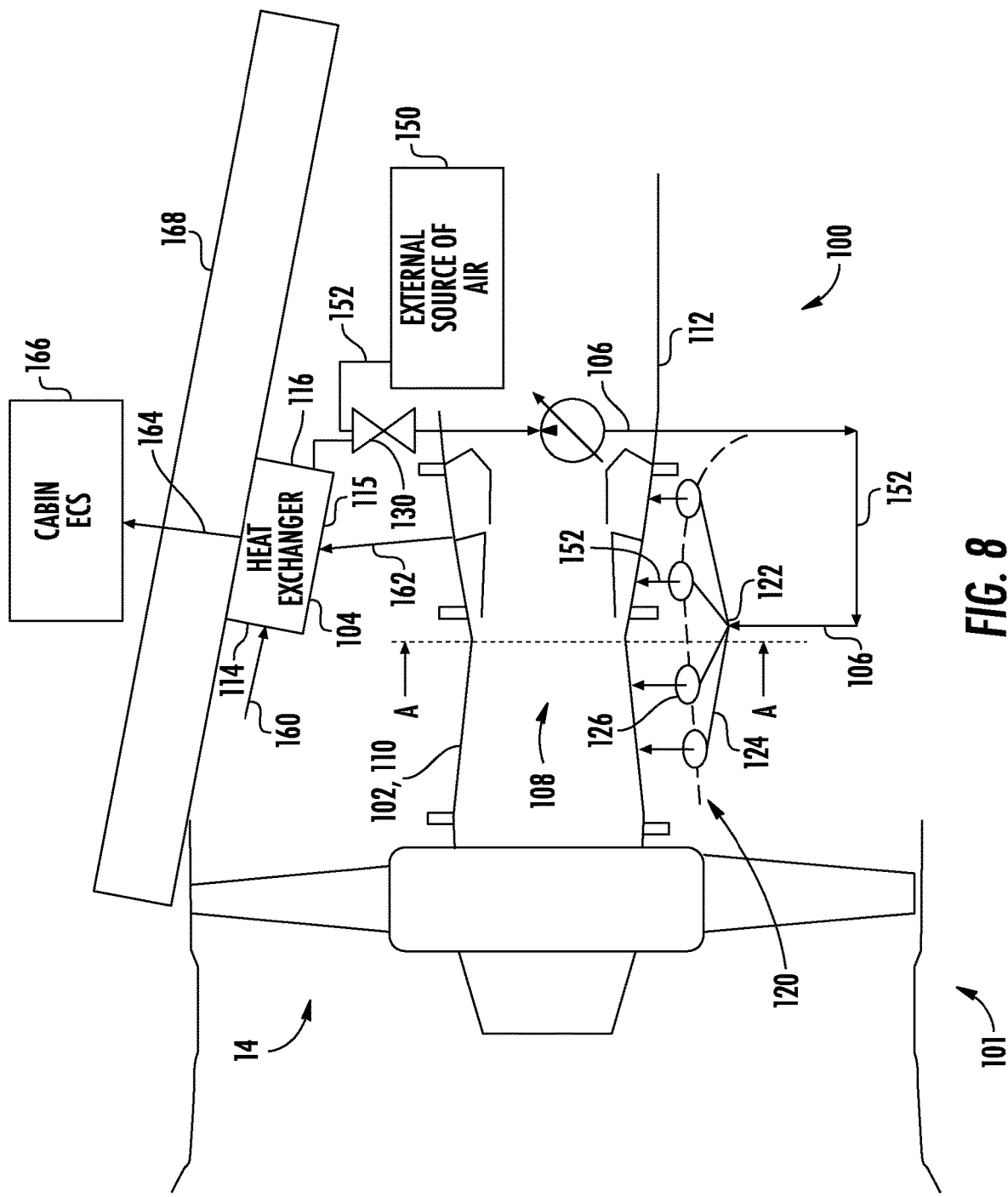
FIG. 8 is a schematic view of a stator temperature control system, with a gas turbine engine in a shutdown condition, in accordance with an exemplary embodiment of the present disclosure.

Referring to FIG. 8, in another exemplary embodiment, a stator temperature control system 100 of the present disclosure also includes an external source of air 150 in communication with the control valve 130 and the bypass supply line 106. In one embodiment, the external source of air 150 provides a second flow of air 152. In an exemplary embodiment, the external source of air 150 is in communication with the control valve 130 such that with the control valve 130 in the first position, the external source of air 150 is not in fluid communication with the bypass supply line 106; and with the control valve 130 in the second position, the external source of air 150 is in fluid communication with the bypass supply line 106, e.g., the bottom portion 112 of the casing 102 receives a second flow of air 152 from the external source of air 150 via the bypass supply line 106 to increase a temperature of the bottom portion 112 of the casing 102 with the gas turbine engine 101 shutdown and/or in a post shutdown condition. As described above, in an exemplary embodiment, the control valve 130 is in the first or open position with a gas turbine engine 101 in a ground idle pre-shutdown condition, and the control valve 130 is in the second or closed position with a gas turbine engine 101 in a shutdown condition.

Figure 7:
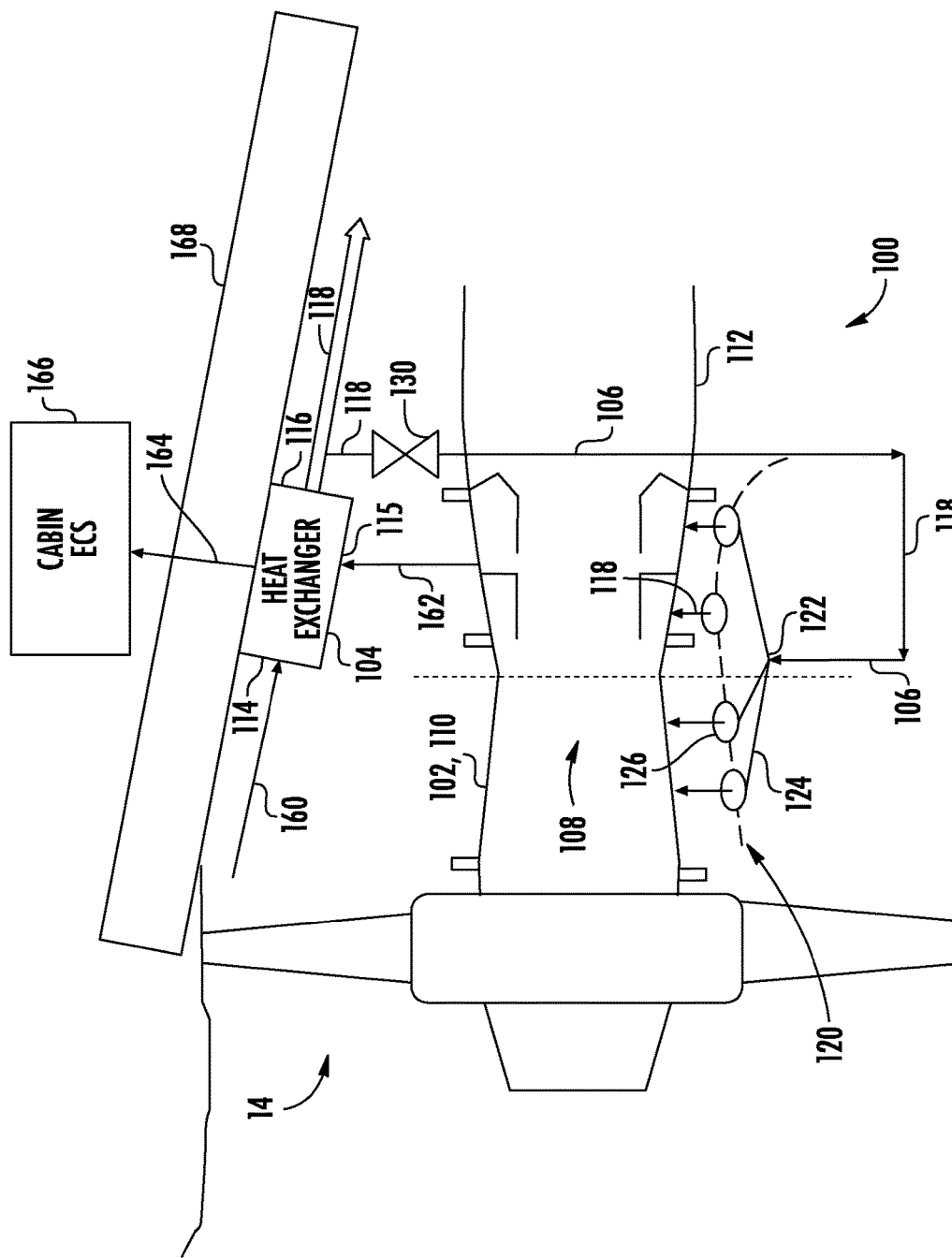
FIG. 7 is a schematic view of a stator temperature control system, with a gas turbine engine in a pre-shutdown condition, in accordance with an exemplary embodiment of the present disclosure.

In other words, in an exemplary embodiment, with the control valve 130 in the first position, the bypass supply line 106 is in fluid communication with the outlet 116 of the heat exchanger 104, as shown in FIGS. 2, 7, and 9; and with the control valve 130 in the second position, the bypass supply line 106 is in fluid communication with the external source of air 150, as shown in FIG. 8.

In such an embodiment, after a gas turbine engine 101 is shutdown, a second flow of air 152 from an external air source 150 is directed to the bottom portion 112 of the casing 102 via the bypass supply line 106 to increase the temperature of the bottom portion 112 of the casing 102 with a gas turbine engine 101 in a shutdown condition.

In an exemplary embodiment, the external source of air 150 may include an auxiliary power unit. In at least certain exemplary embodiments, the external source of air 150 may provide a second flow of air 152 that has a temperature of approximately 450 degrees Fahrenheit. In at least certain exemplary embodiments, the external source of air 150 may provide a second flow of air 152 that has a temperature of approximately 425 degrees Fahrenheit to approximately 475 degrees Fahrenheit. In at least certain exemplary embodiments, the external source of air 150 may provide a second flow of air 152 that has a temperature of approximately 400 degrees Fahrenheit to approximately 500 degrees Fahrenheit. In at least certain exemplary embodiments, the external source of air 150 may provide a second flow of air 152 that has a temperature of approximately 375 degrees Fahrenheit to approximately 525 degrees Fahrenheit. In at least certain exemplary embodiments, the external source of air 150 may provide a second flow of air 152 that has a temperature of approximately 350 degrees Fahrenheit to approximately 550 degrees Fahrenheit.

Figure 6:
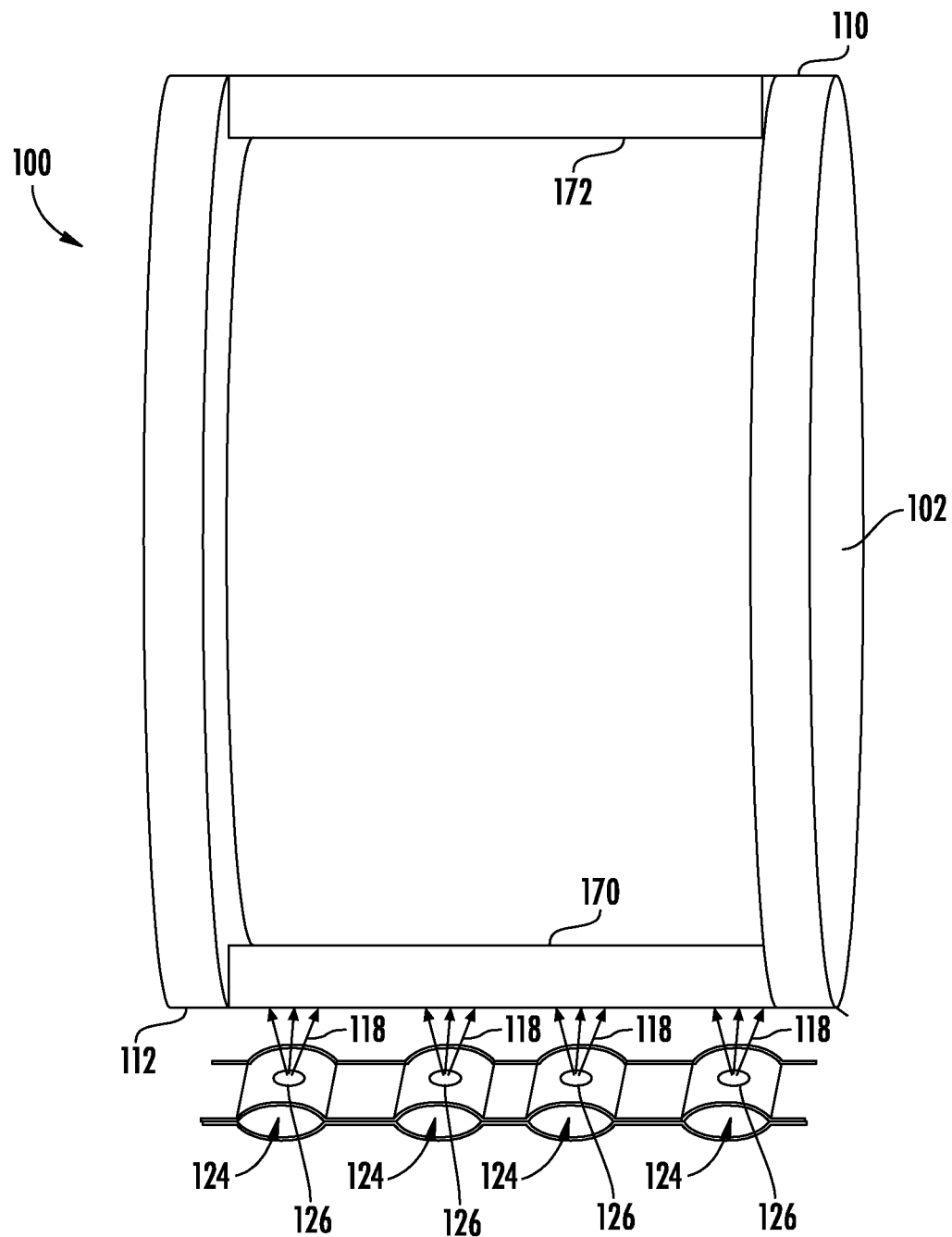
FIG. 6 is a perspective view of a portion of a heat shield surrounding a bottom portion of a casing in accordance with another exemplary embodiment of the present disclosure.

Referring to FIG. 6, in an exemplary embodiment, a stator temperature control system 100 of the present disclosure also includes a temperature control flange 170 disposed in a portion of the casing 102 to slow down any potential losses of heat that is added to the casing 102 using a stator temperature control system 100 of the present disclosure. For example, in one embodiment, the casing 102 includes a first temperature control flange 170 disposed in the bottom portion 112 of the casing 102 and a second temperature control flange 172 disposed in the top portion 110 of the casing 102. These temperature control flanges 170, 172 slow down any losses of heat that is added to the bottom portion 112 of the casing 102, e.g., a flow of exhaust air 118 from the outlet 116 of the heat exchanger 104 via the bypass supply line 106 to increase a temperature of the bottom portion 112 of the casing 102.

In at least certain exemplary embodiments, the casing 102 includes a first temperature control flange 170 disposed in the bottom portion 112 of the casing 102, e.g., approximately a 6 o'clock position of the bottom portion 112 of the casing 102. In at least certain exemplary embodiments, the casing 102 includes a second temperature control flange 172 disposed in the top portion 110 of the casing 102, e.g., approximately a 12 o'clock position of the top portion 110 of the casing 102.

Figure 10:
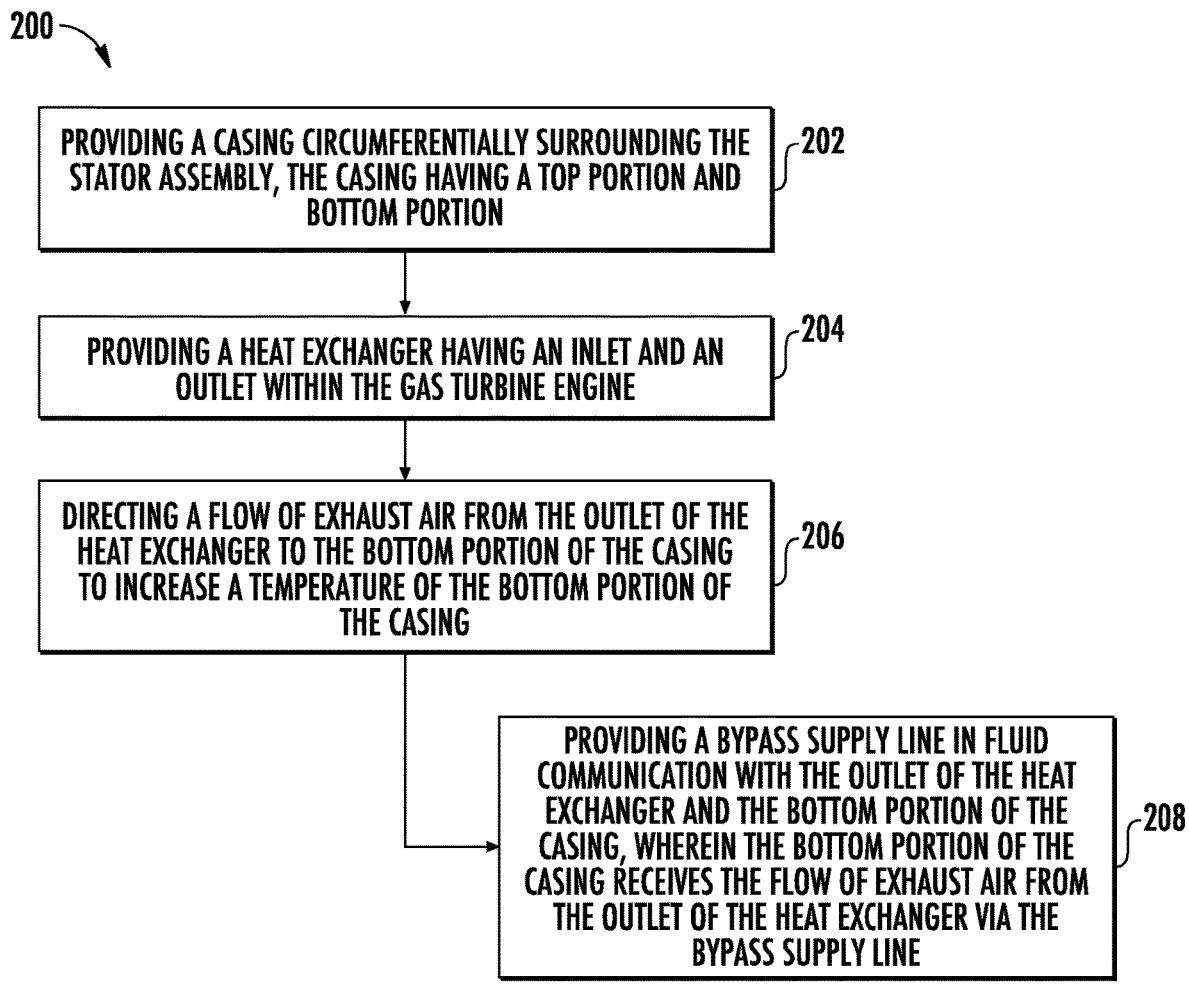
FIG. 10 is a flow diagram of a method of controlling a temperature of a stator assembly for a gas turbine engine in accordance with an exemplary aspect of the present disclosure.

Referring now to FIG. 10, a method 200 of controlling a temperature of a stator assembly for a gas turbine engine in accordance with an exemplary aspect of the present disclosure is depicted. The exemplary method 200 may be utilized to operate one or more of the stator temperature control systems described above with reference to FIGS. 1 through 9.

For the exemplary aspect of FIG. 10, the method 200 generally includes at (202) providing a casing circumferentially surrounding a stator assembly, the casing having a top portion and a bottom portion, as described in detail above with reference to FIGS. 1 through 9.

For the exemplary aspect depicted, the method 200 further includes at (204) providing an air source, e.g., a heat exchanger, having an inlet and an outlet within the gas turbine engine, as described in detail above with reference to FIGS. 1 through 9.

The method 200 further includes at (206) directing a flow of air, e.g., exhaust air, from the outlet of the heat exchanger to the bottom portion of the casing to increase a temperature of the bottom portion of the casing, as described in detail above with reference to FIGS. 1 through 9. For the exemplary aspect depicted, directing the flow of exhaust air from the outlet of the heat exchanger to the bottom portion of the casing includes at (208) providing a supply line, e.g., a bypass supply line, in fluid communication with the outlet of the heat exchanger and the bottom portion of the casing, wherein the bottom portion of the casing receives the flow of exhaust air from the outlet of the heat exchanger via the bypass supply line.

As described in detail above with reference to FIGS. 1 through 10, a stator temperature control system of the present disclosure includes a supply line that is in fluid communication with an outlet of an air source and a bottom portion of a casing surrounding a stator assembly. The supply line is configured to direct a flow of air from the air source to the bottom portion of the casing. In this manner, a stator temperature control system of the present disclosure advantageously is able to utilize a flow of air from the air source to increase a temperature of the bottom portion of the casing to reduce bowed stator.

During an engine shutdown period, the bottom portion of a casing surrounding a stator assembly has a tendency to cool down faster, or more so, than a top portion of a casing surrounding a stator assembly. By heating the bottom portion of the casing surrounding the stator assembly, a stator temperature control system of the present disclosure minimizes bowed rotor start due to stator thermal bowing. In an exemplary embodiment, a stator temperature control system of the present disclosure preheats the bottom portion of the casing surrounding the stator assembly before engine shutdown, e.g., with a gas turbine engine in a ground idle pre-shutdown condition. In this manner, a stator temperature control system of the present disclosure reduces stator thermal bowing during engine shutdown. A stator temperature control system of the present disclosure mitigates the risk of compressor rubs and/or blade tip rubs during bowed rotor start due to stator thermal bowing.

A stator temperature control system of the present disclosure reverses the thermal dynamics of the bottom portion of the casing to keep the bottom portion of the casing more in temperature alignment or uniformity with the top portion of the casing, i.e., the bottom portion and the top portion have a more uniform temperature alignment thereby reducing bowed stator. Another advantage of the present disclosure is that a stator temperature control system does not add any additional heat to the system, and utilizes a flow of air from an air source which is merely dumped in conventional systems.

Further aspects of the invention are provided by the subject matter of the following clauses:

1. A stator temperature control system for a gas turbine engine, the stator temperature control system comprising: a casing circumferentially surrounding a stator assembly, the casing having a top portion and a bottom portion; an air source having an inlet and an outlet; and a supply line in fluid communication with the outlet of the air source and the bottom portion of the casing, wherein the bottom portion of the casing receives a flow of air from the air source via the supply line to increase a temperature of the bottom portion of the casing.

2. The system of any preceding clause, further comprising: a heat shield at least partially surrounding a part of the bottom portion of the casing, wherein the supply line is in fluid communication with the outlet of the air source and the heat shield, wherein the heat shield receives the flow of air from the air source via the supply line, and wherein the heat shield directs the flow of air to the bottom portion of the casing.

3. The system of any preceding clause, wherein the heat shield comprises: a heat shield inlet portion in fluid communication with the supply line; a plurality of flow channels in fluid communication with the heat shield inlet portion; and a plurality of flow apertures spaced around the heat shield and in communication with the plurality of flow channels, respectively, wherein the plurality of flow channels of the heat shield receive the flow of air from the air source via the supply line and the heat shield inlet portion, and wherein the plurality of flow apertures of the heat shield direct the flow of air to the bottom portion of the casing.

4. The system of any preceding clause, further comprising: a control valve between the outlet of the air source and the supply line, the control valve transitionable between an open position in which the supply line is in fluid communication with the outlet of the air source and the heat shield receives the flow of air from the outlet of the air source via the supply line, and a closed position in which the supply line is not in fluid communication with the outlet of the air source.

5. The system of any preceding clause, further comprising: a controller operable to transition the control valve between the open position and the closed position.

6. The system of any preceding clause, wherein the control valve is in the open position with the gas turbine engine in a ground idle pre-shutdown condition.

7. The system of any preceding clause, wherein the control valve is in the closed position with the gas turbine engine in a shutdown condition.

8. The system of any preceding clause, further comprising: a temperature control flange disposed in the bottom portion of the casing.

9. The system of any preceding clause, wherein the inlet of the air source receives bleed air from a portion of the gas turbine engine.

10. The system of any preceding clause, wherein the air source comprises an air supply precooler and the supply line comprises a bypass supply line.

11. A stator temperature control system for a gas turbine engine, the stator temperature control system comprising: a casing circumferentially surrounding a stator assembly, the casing having a top portion and a bottom portion; a heat shield at least partially surrounding a part of the bottom portion of the casing; an air source having an inlet and an outlet; and a supply line in fluid communication with the outlet of the air source and the heat shield, wherein the heat shield receives a flow of air from the air source via the supply line, and wherein the heat shield directs the flow of air to the bottom portion of the casing to increase a temperature of the bottom portion of the casing.

12. The system of any preceding clause, wherein the heat shield comprises: a heat shield inlet portion in fluid communication with the supply line; a plurality of flow channels in fluid communication with the heat shield inlet portion; and a plurality of flow apertures spaced around the heat shield and in communication with the plurality of flow channels, respectively, wherein the plurality of flow channels of the heat shield receive the flow of air from the air source via the supply line and the heat shield inlet portion, and wherein the plurality of flow apertures of the heat shield direct the flow of air to the bottom portion of the casing.

13. The system of any preceding clause, further comprising: a control valve between the outlet of the air source and the supply line, the control valve transitionable between an open position in which the supply line is in fluid communication with the outlet of the air source and the heat shield receives the flow of air from the outlet of the air source via the supply line, and a closed position in which the supply line is not in fluid communication with the outlet of the air source.

14. A method of controlling a temperature of a stator assembly for a gas turbine engine, the method comprising: providing a casing circumferentially surrounding the stator assembly, the casing having a top portion and a bottom portion; providing an air source having an inlet and an outlet within the gas turbine engine; and directing a flow of air from the outlet of the air source to the bottom portion of the casing to increase a temperature of the bottom portion of the casing.

15. The method of any preceding clause, wherein directing the flow of air from the outlet of the air source to the bottom portion of the casing comprises providing a supply line in fluid communication with the outlet of the air source and the bottom portion of the casing, wherein the bottom portion of the casing receives the flow of air from the outlet of the air source via the supply line.

16. The method of any preceding clause, further comprising: providing a heat shield at least partially surrounding a part of the bottom portion of the casing, wherein the supply line is in fluid communication with the outlet of the air source and the heat shield.

17. The method of any preceding clause, wherein directing the flow of air from the outlet of the air source to the bottom portion of the casing comprises moving the flow of air through the supply line to the heat shield, and wherein the heat shield directs the flow of air to the bottom portion of the casing.

18. The method of any preceding clause, wherein directing the flow of air from the outlet of the air source to the bottom portion of the casing occurs with the gas turbine engine in a ground idle pre-shutdown condition and before shutdown of the gas turbine engine.

19. The method of any preceding clause, further comprising: after the gas turbine engine is shutdown, directing a second flow of air from a second air source to the bottom portion of the casing via the supply line to increase the temperature of the bottom portion of the casing.

20. The method of any preceding clause, wherein the inlet of the air source receives bleed air from a portion of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A stator temperature control system for a gas turbine engine, the stator temperature control system comprising:
    a casing circumferentially surrounding a stator assembly, the casing having a top portion and a bottom portion;
    an air source having an inlet and an outlet; and
    a supply line in fluid communication with the outlet of the air source and the bottom portion of the casing,
    wherein the bottom portion of the casing receives a flow of air from the air source via the supply line to increase a temperature of the bottom portion of the casing.

2. The system of claim 1, further comprising:
    a heat shield at least partially surrounding a part of the bottom portion of the casing,
    wherein the supply line is in fluid communication with the outlet of the air source and the heat shield, wherein the heat shield receives the flow of air from the air source via the supply line, and wherein the heat shield directs the flow of air to the bottom portion of the casing.

3. The system of claim 2, wherein the heat shield comprises:
    a heat shield inlet portion in fluid communication with the supply line;
    a plurality of flow channels in fluid communication with the heat shield inlet portion; and
    a plurality of flow apertures spaced around the heat shield and in communication with the plurality of flow channels, respectively,
    wherein the plurality of flow channels of the heat shield receive the flow of air from the air source via the supply line and the heat shield inlet portion, and wherein the plurality of flow apertures of the heat shield direct the flow of air to the bottom portion of the casing.

4. The system of claim 2, further comprising:
    a control valve between the outlet of the air source and the supply line, the control valve transitionable between an open position in which the supply line is in fluid communication with the outlet of the air source and the heat shield receives the flow of air from the outlet of the air source via the supply line, and a closed position in which the supply line is not in fluid communication with the outlet of the air source.

5. The system of claim 4, further comprising:
    a controller operable to transition the control valve between the open position and the closed position.

6. The system of claim 4, wherein the control valve is in the open position with the gas turbine engine in a ground idle pre-shutdown condition.

7. The system of claim 4, wherein the control valve is in the closed position with the gas turbine engine in a shutdown condition.

8. The system of claim 1, further comprising:
    a temperature control flange disposed in the bottom portion of the casing.

9. The system of claim 1, wherein the inlet of the air source receives bleed air from a portion of the gas turbine engine.

10. The system of claim 1, wherein the air source comprises an air supply precooler and the supply line comprises a bypass supply line.

11. A stator temperature control system for a gas turbine engine, the stator temperature control system comprising:
   a casing circumferentially surrounding a stator assembly, the casing having a top portion and a bottom portion;
   a heat shield at least partially surrounding a part of the bottom portion of the casing;
   an air source having an inlet and an outlet; and
   a supply line in fluid communication with the outlet of the air source and the heat shield,
   wherein the heat shield receives a flow of air from the air source via the supply line, and wherein the heat shield directs the flow of air to the bottom portion of the casing to increase a temperature of the bottom portion of the casing.

12. The system of claim 11, wherein the heat shield comprises:
   a heat shield inlet portion in fluid communication with the supply line;
   a plurality of flow channels in fluid communication with the heat shield inlet portion; and
   a plurality of flow apertures spaced around the heat shield and in communication with the plurality of flow channels, respectively,
   wherein the plurality of flow channels of the heat shield receive the flow of air from the air source via the supply line and the heat shield inlet portion, and wherein the plurality of flow apertures of the heat shield direct the flow of air to the bottom portion of the casing.

13. The system of claim 11, further comprising:
   a control valve between the outlet of the air source and the supply line, the control valve transitionable between an open position in which the supply line is in fluid communication with the outlet of the air source and the heat shield receives the flow of air from the outlet of the air source via the supply line, and a closed position in which the supply line is not in fluid communication with the outlet of the air source.

14. A method of controlling a temperature of a stator assembly for a gas turbine engine, the method comprising:
   providing a casing circumferentially surrounding the stator assembly, the casing having a top portion and a bottom portion;
   providing an air source having an inlet and an outlet within the gas turbine engine; and
   directing a flow of air from the outlet of the air source to the bottom portion of the casing to increase a temperature of the bottom portion of the casing.

15. The method of claim 14, wherein directing the flow of air from the outlet of the air source to the bottom portion of the casing comprises providing a supply line in fluid communication with the outlet of the air source and the bottom portion of the casing, wherein the bottom portion of the casing receives the flow of air from the outlet of the air source via the supply line.

16. The method of claim 15, further comprising:
   providing a heat shield at least partially surrounding a part of the bottom portion of the casing, wherein the supply line is in fluid communication with the outlet of the air source and the heat shield.

17. The method of claim 16, wherein directing the flow of air from the outlet of the air source to the bottom portion of the casing comprises moving the flow of air through the supply line to the heat shield, and wherein the heat shield directs the flow of air to the bottom portion of the casing.

18. The method of claim 15, wherein directing the flow of air from the outlet of the air source to the bottom portion of the casing occurs with the gas turbine engine in a ground idle pre-shutdown condition and before shutdown of the gas turbine engine.

19. The method of claim 18, further comprising:
   after the gas turbine engine is shutdown, directing a second flow of air from a second air source to the bottom portion of the casing via the supply line to increase the temperature of the bottom portion of the casing.

20. The method of claim 14, wherein the inlet of the air source receives bleed air from a portion of the gas turbine engine.

* * * * *